United States Patent
Van Tooren et al.

(10) Patent No.: US 11,192,297 B2
(45) Date of Patent: Dec. 7, 2021

(54) COMPOSITE CONTINUOUS FILAMENT FOR ADDITIVE MANUFACTURING

(71) Applicants: UNIVERSITY OF SOUTH CAROLINA, Columbia, SC (US); CLEMSON UNIVERSITY RESEARCH FOUNDATION, Clemson, SC (US); TIGHITCO, Inc., North Charleston, SC (US)

(72) Inventors: Michael Johannes Leonardus Van Tooren, Elgin, SC (US); Igor Luzinov, Clemson, SC (US); Nikolay Borodinov, Central, SC (US); Wout De Backer, Columbia, SC (US); Arturs Peteris Bergs, Cayce, SC (US)

(73) Assignees: University of South Carolina, Columbia, SC (US); Clemson University Research Foundation, Clemson, SC (US); TIGHITCO. Inc., North Charleston, SC (US)

( * ) Notice: Subject to any disclaimer, the term of this patent is extended or adjusted under 35 U.S.C. 154(b) by 319 days.

(21) Appl. No.: 15/602,360

(22) Filed: May 23, 2017

(65) Prior Publication Data
US 2017/0341301 A1    Nov. 30, 2017

Related U.S. Application Data

(60) Provisional application No. 62/340,755, filed on May 24, 2016.

(51) Int. Cl.
*B29C 64/165* (2017.01)
*B29C 64/209* (2017.01)
(Continued)

(52) U.S. Cl.
CPC .......... *B29C 64/165* (2017.08); *B29B 15/125* (2013.01); *B29C 64/106* (2017.08);
(Continued)

(58) Field of Classification Search
CPC ........ B29C 64/171–182; B29C 64/314; B29B 15/125; B29B 15/09; B29B 15/15; D06B 3/00–16; D06B 5/00–12
See application file for complete search history.

(56) References Cited

U.S. PATENT DOCUMENTS 2,441,308 A * 5/1948 Bond ...................... D06B 3/185
68/184
4,898,527 A 2/1990 Claassen et al.
(Continued)

FOREIGN PATENT DOCUMENTS

CN   204431743   7/2015
DE   10049473    5/2001
(Continued)

OTHER PUBLICATIONS

Zhang et al.,"Build Orientation Determination for Multi-material Deposition Additive Manufacturing with Continuous Fibers", ScienceDirect, 26th CIRP Design Conference, Jun. 2016, pp. 1-6.
(Continued)

*Primary Examiner* — Matthew J Daniels
*Assistant Examiner* — Andrew L Swanson
(74) *Attorney, Agent, or Firm* — Dority & Manning, P.A.

(57) ABSTRACT

A composite filament for use in additive manufacturing such as fused filament fabrication is described along with methods of its construction and use. The composite filament includes a single continuous filament (e.g., a continuous carbon roving) and a polymer (e.g., a high glass transition polymer) in intimate contact. The composite filament is formed through immersion of the continuous filament in a
(Continued)

solution of the polymer. The composite filament can be combined with an additional formation material in an additive manufacturing process.

25 Claims, 4 Drawing Sheets

(51) Int. Cl.

| | |
|---|---|
| *B29C 64/314* | (2017.01) |
| *B29C 70/30* | (2006.01) |
| *B29B 15/12* | (2006.01) |
| *B29C 64/118* | (2017.01) |
| *B33Y 10/00* | (2015.01) |
| *B33Y 70/00* | (2020.01) |
| *B29C 64/106* | (2017.01) |
| *B29C 70/20* | (2006.01) |
| *B29K 105/10* | (2006.01) |
| *B29K 307/04* | (2006.01) |

(52) U.S. Cl.
CPC .......... *B29C 64/118* (2017.08); *B29C 64/209* (2017.08); *B29C 64/314* (2017.08); *B29C 70/20* (2013.01); *B29C 70/30* (2013.01); *B33Y 10/00* (2014.12); *B33Y 70/00* (2014.12); *B29K 2105/106* (2013.01); *B29K 2307/04* (2013.01)

(56) References Cited

U.S. PATENT DOCUMENTS

| | | | | |
|---|---|---|---|---|
| 5,470,647 | A * | 11/1995 | Zimics | B29C 70/086 |
| | | | | 156/162 |
| 5,936,861 | A * | 8/1999 | Jang | B33Y 10/00 |
| | | | | 700/98 |
| 6,113,696 | A | 9/2000 | Tseng et al. | |
| 6,419,981 | B1 * | 7/2002 | Novich | C03C 25/00 |
| | | | | 427/180 |
| 9,211,674 | B2 | 12/2015 | Van Tooren et al. | |
| 9,745,452 | B2 | 8/2017 | Hwang et al. | |
| 2001/0030383 | A1 * | 10/2001 | Swanson | B33Y 30/00 |
| | | | | 264/308 |
| 2009/0062426 | A1 * | 3/2009 | Shiraki | C08L 23/147 |
| | | | | 523/205 |
| 2014/0291886 | A1 | 10/2014 | Mark et al. | |
| 2015/0108677 | A1 * | 4/2015 | Mark | B29C 70/20 |
| | | | | 264/138 |
| 2015/0165666 | A1 | 6/2015 | Butcher et al. | |
| 2016/0177078 | A1 | 6/2016 | Naito et al. | |
| 2016/0347009 | A1 * | 12/2016 | Gaillard | B29B 15/12 |
| 2017/0037933 | A1 * | 2/2017 | Takami | D06M 15/41 |
| 2017/0044337 | A1 | 2/2017 | Van Tooren et al. | |
| 2017/0106565 | A1 | 4/2017 | Braley et al. | |
| 2017/0136707 | A1 | 5/2017 | Batchelder et al. | |
| 2018/0063895 | A1 | 3/2018 | Van Tooren et al. | |

FOREIGN PATENT DOCUMENTS

| | | |
|---|---|---|
| JP | S 56161259 | 12/1981 |
| KR | 2018/0040555 | 4/2018 |
| KR | 2018/0055425 | 5/2018 |
| WO | WO 2017/035313 | 3/2017 |
| WO | WO 2017/210504 | 12/2017 |

OTHER PUBLICATIONS

International Search Report and Written Opinion for PCT/US2017/033983, dated Aug. 8, 2017.

Ageorges, et al. "Fusion Bonding of Polymer Composites, Engineering Materials and Processes" (2002). ISBN 1-85233-429-0, (Abstract only).

Burtovyy, et al. "Hydrophobic modification of polymer surfaces via "grafting to" approach." *Journal of Macromolecular Science Part B: Physics*, 46(1), (2007), pp. 137-154.

Draper, et al. "Mixed Polymer Brushes by Sequential Polymer Addition: Anchoring Layer Effect" *Langmuir* 20, (2004), pp. 4064-4075.

Iyer, et al. "Polystyrene Layers Grafted to Macromolecular Anchoring Layer." *Macromolecules* 36, (2003), pp. 6519-6526.

Li, et al. "Fabrication of paper-based microfluidic sensors by printing." *Colloids and Surfaces B: Biointerfaces* 76(2), (2010), pp. 564-570.

Liu, et al. "Polymer Grafting via ATRP Initiated from Macroinitiator Synthesized on Surface." *Langmuir* 20. (2004), pp. 6710-6718.

Liu, et al. "Synthesis of High-Density Grafted Polymer Layers with Thickness and Grafting Density Gradients" *Langmuir* 21, (2005). pp. 11806-11813.

Luzinov, I., "Nanofabrication of thin polymer films" Nanofibers and Nanotechnology in Textiles, Woodhead Publishing Ltd., 2007. pp. 448-469.

Luzinov, et al. "Responsive brush layers: from tailored gradients to reversibly assembled nanoparticles." *Soft Matter* 4(4), (2008), pp. 714-725.

Offringa, et al. "Butt-joined, Thermoplastic Stiffened-skin Concept Development," *Sampe Journal* 48(2), (2012), pp. 7-15.

Zdyrko, et al. "Nano-patterning with polymer brushes via solvent-assisted polymer grafting," *Soft Matter* 4, (2008), p. 2213-2219.

Zdyrko, et al. "Synthesis and Surface Morphology of High-Density Poly(ethylene glycol) Grafted Layers" *Langmuir* 19(24), (2003), pp. 10179-10187.

Zdyrko, et al. "Polymer Brushes by the "Grafting to" Method." *Macromolecular Rapid Communications* 32(12), (2011), pp. 859-869.

Zhang, et al. "Build Orientation Determination for Multi-material Deposition Additive Manufacturing with Continuous Fibers" *Procedia CIRP* (2016), pp. 1-6.

IB WIPO International Preliminary Report on Patentability (PCT/US2017/033983), dated Dec. 6, 2018.

* cited by examiner

COMPOSITE CONTINUOUS FILAMENT FOR ADDITIVE MANUFACTURING

CROSS REFERENCE TO RELATED APPLICATION

This application claims filing benefit of U.S. Patent Application Ser. No. 62/340,755 having a filing date of May 24, 2016, which is incorporated herein by reference in its entirety.

BACKGROUND

Additive manufacturing refers to any method for forming a three-dimensional ("3D") object in which successive layers of material are laid down according to a controlled deposition and solidification process. The main differences between additive manufacturing processes are the types of materials to be deposited and the way the materials are deposited and solidified. Fused filament fabrication (also commonly referred to as fused deposition modeling) extrudes materials including liquids (e.g., polymeric melts or gels) and extrudable solids (e.g., clays or ceramics) to produce a layer, followed by spontaneous or controlled solidification of the extrudate in the desired pattern of the structure layer. Other additive manufacturing processes deposit solids in the form of powders or thin films, followed by the application of energy and/or binders often in a focused pattern to join the deposited solids and form a single, solid structure having the desired shape. Generally, each layer is individually treated to solidify the deposited material prior to deposition of the succeeding layer, with each successive layer becoming adhered to the previous layer during the solidification process.

Unfortunately, while additive manufacturing technologies have become much more common and less expensive in recent years, the technology is primarily limited to formation of prototypes, as the formation materials have been limited to those that can be extruded in a relatively narrow temperature range and generally exhibit low strength characteristics. Attempts have been made to form higher strength composite structures, for instance by combining a high crystalline polymer with a lower crystalline polymer in a fused filament fabrication. While such attempts have provided some improvement in the art, room for further improvement exists.

What are needed in the art are high strength materials capable of use as formation materials in an additive manufacturing process.

SUMMARY

Disclosed is a composite filament as may be utilized in an additive manufacturing process and a method for forming a composite filament. For instance, a method can include immersing a continuous filament (e.g., a continuous roving) in a solution that includes a dissolved polymer and a solvent for the polymer. In one embodiment, the polymer can have a high glass transition temperature ($T_g$), e.g., about 150° C. or greater. The continuous filament can be immersed in the solution for a period of time (e.g., a few seconds to several minutes), for instance as the continuous filament is pulled through the solution. During the immersion, the dissolved polymer can permeate the continuous filament. Following removal, the solvent can be removed from the wet composite filament by air drying, heating, or any other suitable process, leaving the polymer and the continuous filament (e.g., the individual filaments of a roving) in intimate contact in the composite filament.

Also disclosed is an additive manufacturing process. For example, a process can include depositing a composite filament on a print bed in conjunction with a formation material. For instance, the composite filament and the formation material can be co-extruded from a print head as a composite material and deposited onto a print bed. In one particular embodiment the formation material can be provided to the print head in the form of a second polymeric filament, for instance a polymeric filament that can include the same polymer as is contained in the composite filament. In any case, the composite filament and the formation material can be located on the print bed according to a pre-determined pattern as the print head and/or the print bed is moved to build a composite structure and form the additive manufactured product.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
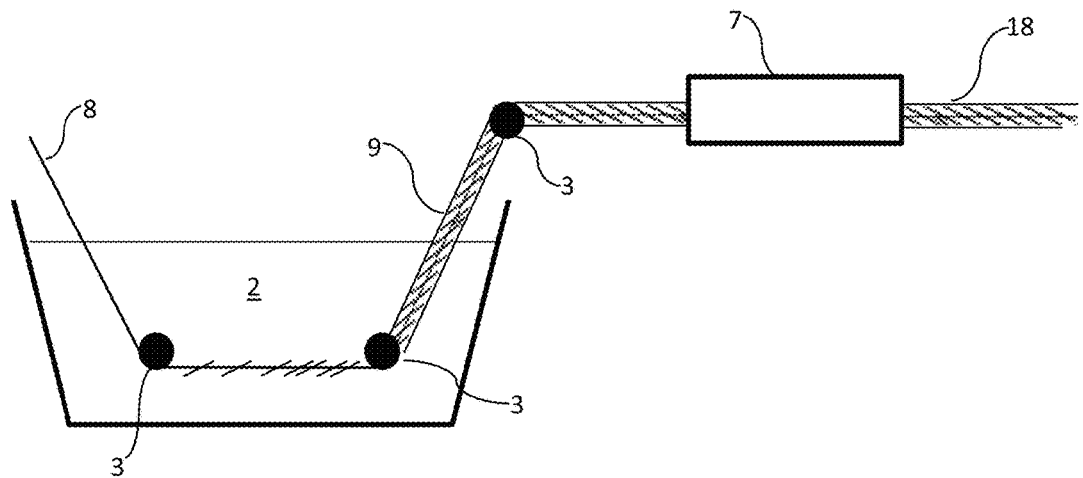
FIG. 1 illustrates a method for forming a composite filament as described herein.

Repeat use of reference characters in the present specification and drawings is intended to represent the same or analogous features or elements of the present invention.

DETAILED DESCRIPTION

Reference now will be made to embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A composite filament for use in additive manufacturing such as fused filament fabrication is generally provided, along with methods of its construction and use. Generally, the composite filament allows for formation of work pieces having a complicated shape that can incorporate continuous filaments in multiple directions and orientations, which can lead to the production of stronger and more useful composite structures. In particular, the composite filaments can combine the strength and stiffness of continuous filaments (e.g., carbon tows) with the formation flexibility of additive manufacturing formation materials (e.g., polymers) to provide a composite filament capable of successful deposition according to an additive manufacturing process.

The composite filaments are particularly suitable for formation of structures for use in high performance environments, e.g., environments operating under high thermal, chemical, and/or mechanical stresses. Examples of encompassed products commonly found in such environments can include, without limitation, duct work, conduit, tubing, piping, channeling, hollow-chambered structures, fairings, brackets, sparse filled closed geometries, solid infill closed geometries, spacers, ribs and stiffeners, and other similar structures. As an example, the composite filaments can be used in forming thin-walled, complex-shaped reinforced parts that heretofore could only be manufactured in a complex, multi-step process.

The composite filaments can include a high-strength continuous filament in conjunction with a polymer, e.g., a high performance polymer, and in one particular embodiment with a thermoplastic polymer that exhibits a high glass transition temperature. The composite filaments can be utilized to address the stiffness, strength, and environmental performance shortcomings (e.g., thermal resistance) that have been associated with forming such parts according to conventional techniques and materials. Disclosed methods and materials can be particularly beneficial for reinforcing parts in a direction that is non-orthogonal to the build direction of the part. Thus, the composite filaments can provide for the formation of continuous filament reinforced composite parts having complicated geometries and exhibiting high performance characteristics with reinforcement in any one as well as multiple different directions according to an additive manufacturing process.

FIG. 1 schematically illustrates one method for forming a composite filament. The method can include immersing a continuous filament 8 into a solution 2 that includes a polymer in a dissolved state and a solvent for the polymer.

While the composite filaments can incorporate any continuous filament 8 as is known in the art, in particular embodiments the continuous filament 8 can be a high strength, high performance continuous filament. The high strength continuous filament 8 can be utilized as an individual filament (e.g., as a porous or shaped filament that can be permeated with the polymer solution) or as a bundle of individual filaments, e.g., a roving. As used herein, the term "roving" generally refers to a bundle of generally aligned individual filaments and is used interchangeably with the term "tow." The individual filaments contained within the roving can be twisted or can be straight and the bundle can include individual filaments twisted about one another or generally parallel continuous filaments with no intentional twist to the roving. Although different filaments can be used in a roving, it can be beneficial in some embodiments to utilize a roving that contains a plurality of a single filament type, for instance to minimize any adverse impact of using filament types having a different thermal coefficient of expansion. The number of filaments contained in a roving can be constant or can vary from one portion of the roving to another and can depend upon the material of the filament. A roving can include, for instance, from about 500 individual filaments to about 100,000 individual filaments, or from about 1,000 individual filaments to about 75,000 individual filaments, and in some embodiments, from about 5,000 individual filaments to about 50,000 individual filaments.

The continuous filament 8 can possess a high degree of tensile strength relative to the mass. For example, the ultimate tensile strength of a continuous filament 8 can be about 3,000 MPa or greater. For instance, the ultimate tensile strength of a continuous filament 8 as determined according to ASTM D639 (equivalent to ISO testing method 527) is typically from about 3,000 MPa to about 15,000 MPa, in some embodiments from about 4,000 MPa to about 10,000 MPa, and in some embodiments from about 5,000 MPa to about 6,000 MPa. Such tensile strengths may be achieved even though the filaments are of a relatively light weight, such as a mass per unit length of from about 0.1 to about 2 grams per meter, in some embodiments from about 0.4 to about 1.5 grams per meter. The ratio of tensile strength to mass per unit length may thus be about 2,000 Megapascals per gram per meter ("MPa/g/m") or greater, in some embodiments about 4,000 MPa/g/m or greater, and in some embodiments, from about 5,500 to about 30,000 MPa/g/m.

A continuous filament 8 may be an organic filament or an inorganic filament. For example, a continuous filament 8 may include a metal (e.g., copper, steel, aluminum, stainless steel, etc.), basalt, glass (e.g., E-glass, A-glass, C-glass, D-glass, AR-glass, R-glass, S1-glass, S2-glass, etc.), carbon (e.g., amorphous carbon, graphitic carbon, or metal-coated carbon, etc.), nanotubes, boron, ceramics (e.g., boron, alumina, silicon carbide, silicon nitride, zirconia, etc.), aramid (e.g., Kevlar® marketed by E. I. duPont de Nemours, Wilmington, Del.), synthetic organics (e.g., polyamide, ultra-high molecular weight polyethylene, paraphenylene, terephthalamide, and polyphenylene sulfide), polybenzimidazole (PBI) filaments, and various other natural or synthetic inorganic or organic materials known for forming fibrous reinforcing compositions. However, the continuous filament should be formed of materials having a melting temperature greater than the deposition temperature of the additive manufacturing process in which the composite filaments will be used and greater than the thermoplastic polymer that will be combined with the continuous filament in forming the composite filament. The materials used to form the filaments can optionally include one or more various additives as are known in the art, e.g., colorants, plasticizers, etc.

Carbon filaments are suitable for use as the continuous filaments in one embodiment. Carbon filaments can typically have a tensile strength to mass ratio in the range of from about 5,000 to about 7,000 MPa/g/m.

The continuous filaments can generally have a nominal diameter of about 2 micrometers or greater, for instance about 4 to about 35 micrometers, and in some embodiments, from about 5 to about 35 micrometers.

Referring again to FIG. 1, a continuous filament 8 can be immersed in a solution 2 that includes a polymer dissolved in a solvent. For instance, the continuous filament 8 can be pulled and/or pushed through a bath of the solution by use of a series of rollers 3, as shown. While the composite filament can generally incorporate any polymer that may be successfully associated with the continuous filament 8, in one embodiment the polymer can be a high performance thermoplastic polymer or a thermoset polymer. High performance polymers as may be incorporated in the composite filament can include, without limitation, amorphous thermoplastics such as polysulfone (PSU), poly(ethersulfone) (PES), and polyetherimide (PEI), as well as semi-crystalline thermoplastics such as poly(phenylene sulfide) (PPS), polyaryl ether ketones (PAEK) including polyether ketones (PEK) and polyetheretherketone (PEEK), partly aromatic polyamides such as polyphthalamide (PPA), liquid-crystalline polymers (LCP), polyphenylene sulfones (PPSU), as well as blends and copolymers of thermoplastics.

Suitable thermoset polymers can include, without limitation, epoxy resins, silicone resins, polyimides, phenol formaldehyde resin, diallyl phthalate, as well as combinations of materials. It will be understood by one of ordinary skill in the art that when considering utilization of a thermoset polymer in formation of the composite filament, it may be beneficial to encourage final cure of the polymer following the additive manufacturing process, so as to improve consolidation of the composite filament in the manufactured structure.

In one particular embodiment, a thermoplastic polymer that exhibits a high glass transition temperature ($T_g$) can be incorporated in the composite filament. For instance, a thermoplastic polymer having a glass transition temperature of about 150° C. or greater can be dissolved in the solution 2. Exemplary high $T_g$ polymers can include, without limitation, polyethyleneimine ($T_g$=215° C.), PEI ($T_g$=217° C.), polyamide-imide ($T_g$=275° C.), polyarylate ($T_g$=190° C.), PES ($T_g$=210° C.-230° C.), polyimide ($T_g$=250° C.-340° C.), polyphenylene ($T_g$=158° C.-168° C.), and amorphous thermoplastic polyimide ($T_g$=247° C.). Other examples of high $T_g$ polymers include those that contain one or more of the following monomers (listed along with a published $T_g$ for the homopolymer): 2-vinyl naphthalene ($T_g$=151° C.), 2,4,6-trimethylstyrene ($T_g$=162° C.), 2,6-dichlorostyrene ($T_g$=167° C.), vinyl carbazole ($T_g$=227° C.), vinyl ferrocene ($T_g$=189° C.); acenaphthalene ($T_g$=214° C.), and methacrylic acid anhydride ($T_g$=159° C.).

The solution can include a solvent for the polymer, which can encompass organic or aqueous solvents, as determined according to the characteristics of the polymer. For instance, a solution can include PEI in solution with a suitable solvent, e.g., methanol, ethanol, or chloroform, as is known in the art. The solution can generally include the polymer in an amount of about 20 wt. % or less, about 10 wt. % or less, or about 5 wt. % or less in some embodiments. For instance, the solution can include the polymer in an amount of from about 0.3 wt. % to about 5 wt. % or from about 0.3 wt. % to about 3 wt. % in some embodiments.

As illustrated in FIG. 1, as the continuous filament 8 is immersed in the solution 2, the filament 8 can pick up polymer contained in the solution to form a wet composite filament 9. Though illustrated as passing through a single polymer solution bath, this is not a requirement of a process, and in other embodiments, a continuous filament can pass through multiple baths of polymer solution, the solutions of which can be the same or differ from one another. Following immersion in one or more polymer solutions, the wet composite filament 9 can be dried to remove the solvent and form the composite filament 18. For instance, the wet composite filament 9 can be dried through application of energy, e.g., through use of a dryer 7.

Figure 2:
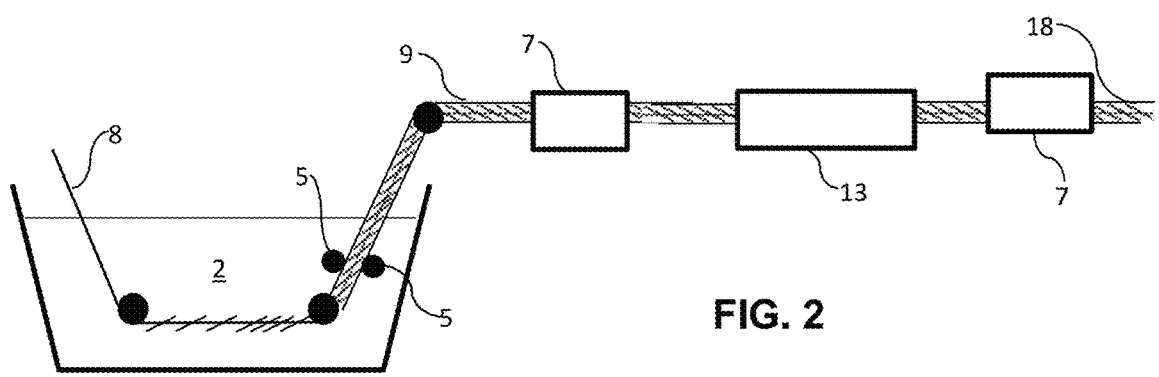
FIG. 2 illustrates another method for forming a composite filament as described herein

The composite filament formation process can include additional formation steps in some embodiments. For instance, as illustrated in FIG. 2, a process can include a calendaring step during which the composite filament can pass through a series of nip rolls 5 or the like that can improve impregnation of the dissolved polymer into the filament 8.

In one embodiment, a formation process can include a die 13 through use of which the composite filament 18 can be further formed or molded. For instance, either in-line with initial formation or as a component of a separate system, the initially formed composite filament 18 can be fed through a heated die 13 that can, e.g., incorporate additional polymer into the composite polymer, mold the filament and/or modify the cross-sectional shape of the composite filament 18 to, e.g., provide a particular and/or more consistent shape to the composite filament 18. Depending upon the nature of the die 13, it may prove beneficial to incorporate a second dryer 7 or the like downstream of the die 13. In one embodiment, a pultrusion system can be used to encourage motion of the composite fiber through the system and/or one or more sub-systems of a process.

Figure 3:
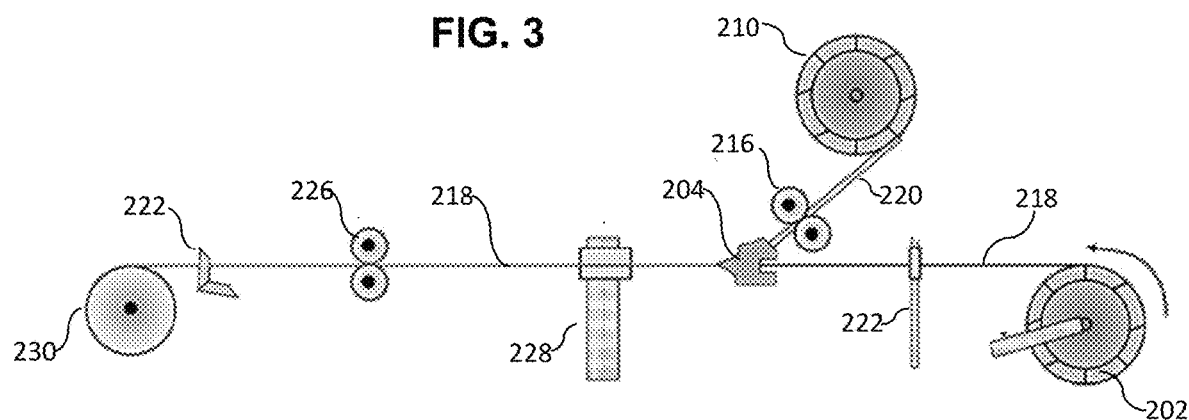
FIG. 3 illustrates a composite fiber shaping system as may be incorporated in some embodiments of a system.

FIG. 3 illustrates one embodiment of a shaping system that can be utilized to shape a composite fiber 218 prior to deposition. In this particular embodiment, the shaping system can be physically separated from the initial formation system and as such can include an unwinder 202 that is capable of retaining and unwinding a spool of composite fiber 218 that has been previously formed. Alternatively, as discussed above, a shaping system can be in-line with an initial formation system. A shaping system can include a die 204 through which the composite fiber 218 can pass to be shaped as desired. For instance, following initial formation, a composite fiber can have a non-circular cross section, such as in the form of a flat tape or the like. A die 204 can be utilized to heat and reshape the composite fiber 218, for instance to exhibit a circular cross section. Of course, any cross sectional shape can be provide by a die including, without limitation, flat tapes, non-circular ovals, circular, square, channeled or angled fibers (e.g., 'U', 'V', or 'J' shaped fibers), and so forth.

In some embodiments to improve shaping of the composite fiber 218 the fiber can be contacted with a lubricant 220 at or upstream of the die 204. The lubricant can generally be a polymeric material that can surround and adhere to the composite fiber 218 and encourage the shaping of the composite fiber 218 as it passes through the die 204. In one particular embodiment, the lubricant 220 can include a polymer or polymeric composition that also forms the polymeric component of the composite fiber 218. A polymeric lubricant 220 can be provided to the die 204 as a solid, for instance in the form of a polymer tape or fiber and can be fed to the die 204 from a spool 210, for instance by use of a feeding motor 216. A polymeric lubricant 220 can provide additional benefit to the composite fiber as well. For instance, the presence of the polymeric lubricant 220 on the surface of the composite fiber 218 can protect the fiber 218 during downstream processing and can prevent the buildup of noils (due to fraying or breakage of components from the composite fiber) and/or excess polymer at downstream processing units.

Figure 4:
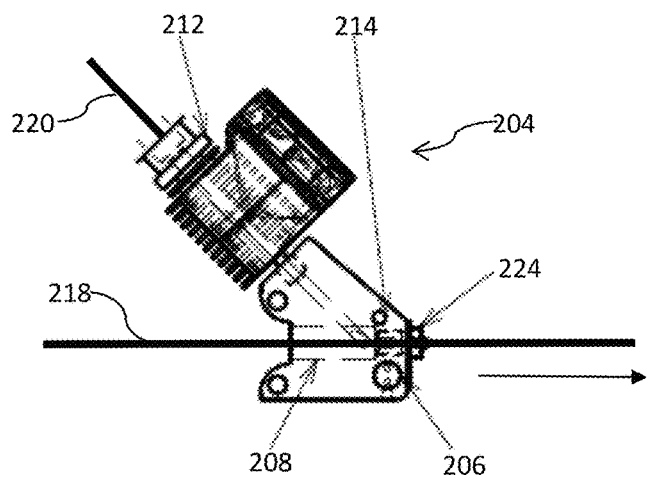
FIG. 4 illustrates a die for use in shaping a composite fiber.

In the embodiment of FIG. 3, the lubricant 220 can contact the composite fiber 218 at the die 204. For example, and as illustrated in more detail in FIG. 4, the composite fiber 218 and the lubricant 220 in the form of a polymeric fiber can pass into the interior of the die 204, which can be heated, for instance by use of a heater cartridge 206. The die 204 can be heated to a temperature suitable for melting the polymer component of the composite fiber 218 and the polymer of the lubricant 220. Thus, the die 204 can include a melt zone 208 where the composite fiber 218 and the lubricant 220 can contact one another at a temperature above their respective melting temperatures. A die 204 can also include features as are standard in the art such as a heat sink, 212, thermocouples 214, etc. Following contact, the hot composite fiber 218 at least partially coated with the liquid lubricant 220 can be forced through the shaping unit 224 of the die 204 so as to attain the desired cross-sectional shape prior to proceeding to further processing as indicated by the directional arrow of FIG. 4.

A shaping system can include additional components as are generally known in the art including, without limitation, guides 222, cleaning units 228 (e.g., brushes or rinsing units), sensors 226, and so forth. In those embodiments in which the shaping system is held separately from the deposition system, the shaping system can also include a take-up reel 230, which can collect and store the shaped composite fiber 218 for further use. A take-up reel 230 can also provide tension for pulling the composite fiber 128 through the shaping system, in some embodiments.

Figure 5:
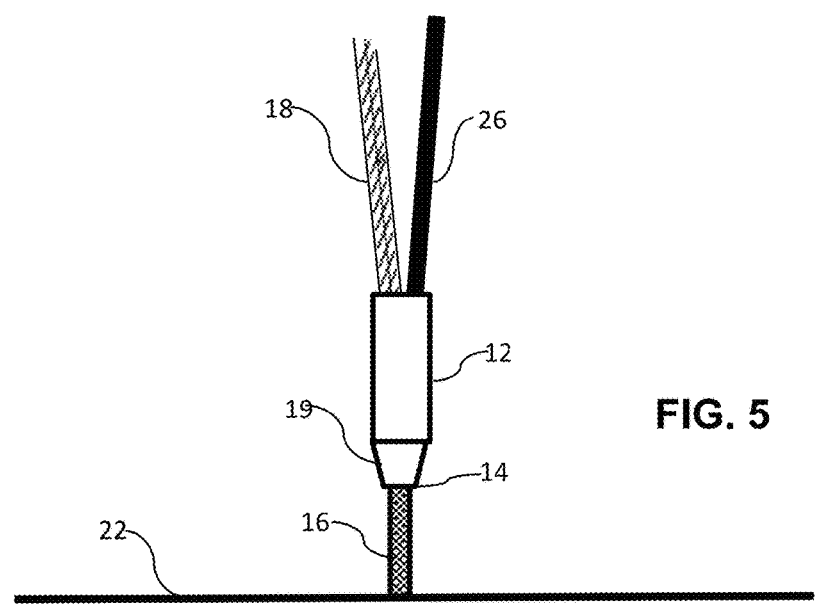
FIG. 5 illustrates an additive manufacturing method incorporating a composite filament.

FIG. 5 illustrates one embodiment of an additive manufacturing process as may be utilized to form a structure incorporating the composite filament. As shown, the composite filament 18 can be combined with a formation material 26. In this embodiment, the formation material 26 can be provided to a print head 12 in the form of a second filament. For instance, the formation material 26 can be a metal, a polymeric material, etc. that is fed to the print head 12 and is heated above the softening or melting temperature of the formation material 26 to soften and/or liquefy so as to be combined with the composite filament 18 within the print head 12. The composite filament 18 is likewise heated to a temperature above the melting temperature of the polymer of the composite. The composite filament 18 can be provided to the print head from a conveniently placed storage location, for instance from a spool of previously formed and shaped composite filament 18 that can be mounted on an end effector of a deposition system. Upon combination of the formation material 26 with the composite filament 18 within the print head 12, the formation material 26 can blend and/or bond with the polymer of the composite filament 18 and the formation material 26 can form a partial or continuous coating on the composite filament 18 and thereby form a composite material 16. The composite material 16 thus formed that includes a combination of the composite filament 18 with a formation material 26 can pass through the extrusion tip 14 to the printing surface 22.

The formation material 26 may be formed of one material or an admixture of multiple materials. The formation material 26 can be, for example, a gel, a high viscosity liquid, or a formable solid that can be extruded in the desired pattern. Formation materials likewise can be organic or inorganic. Formation materials can include, without limitation, polymers including thermoplastic polymers or thermoset polymers (e.g., polyolefins, polystyrenes, polyvinyl chloride, elastomeric thermoplastics, polycarbonates, polyamides, etc.), eutectic metal alloy melts, clays, ceramics, silicone rubbers, and so forth. Blends of materials can also be utilized as the formation materials, e.g., polymer blends. The formation materials can include additives as are generally known in the art such as, without limitation, dyes or colorants, flow modifiers, stabilizers, nucleators, flame retardants, and so forth.

In one particular embodiment, the formation material 26 can include the same polymer as the polymer of the composite filament 18. For instance, the composite filament 18 can include a continuous filament and a high $T_g$ thermoplastic polymer, such as PEI, and the formation material 26 can likewise include PEI. This can improve blending and bonding of the materials in the print head in formation of the composite material 16.

The composite material 16 can be discharged from the print head 12 at a nozzle 19 during the formation of an individual layer of an additively manufactured product structure. Thus, the nozzle 19 can be sized and shaped as desired depending upon the particular characteristics of the composite material 16 to be discharged. In general, a nozzle 19 can have an outlet on the order of about 10 millimeters or less, for instance about 5 millimeters or less, or from about 0.5 millimeters to about 2 millimeters in some embodiments. The shape of the nozzle 19 can also be varied. For instance, a nozzle 19 can have a more rounded radial edge as compared to previously known fused filament fabrication print heads, so as to better accommodate the composite material 16.

Any suitable method for combining the composite filament 18 and the formation material 26 can be utilized, provided that the continuous filament of the composite filament 18 is adequately incorporated with the formation material 26 following deposition. The type of bond formed between the composite filament 18 and the formation material 26 can depend upon the materials involved. For instance a thermal bond, a chemical bond, a friction bond, an electrostatic bond, etc., as well as combinations of bond types can be formed between the continuous filament and the polymer of the composite filament 18 and between either or both of these components of the composite filament 18 and the formation material 26 in order that the components will be effectively bonded to one another.

Figure 6:
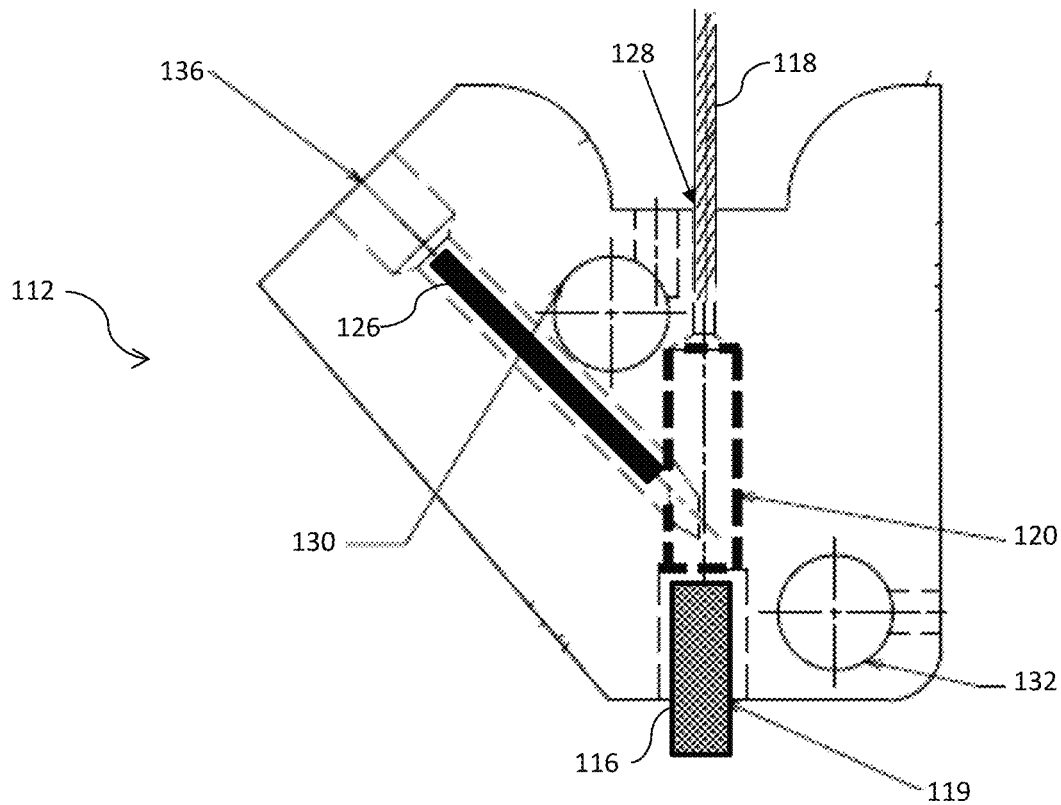
FIG. 6 illustrates one embodiment of a print head as may be utilized in an additive manufacturing method.
Figure 7:
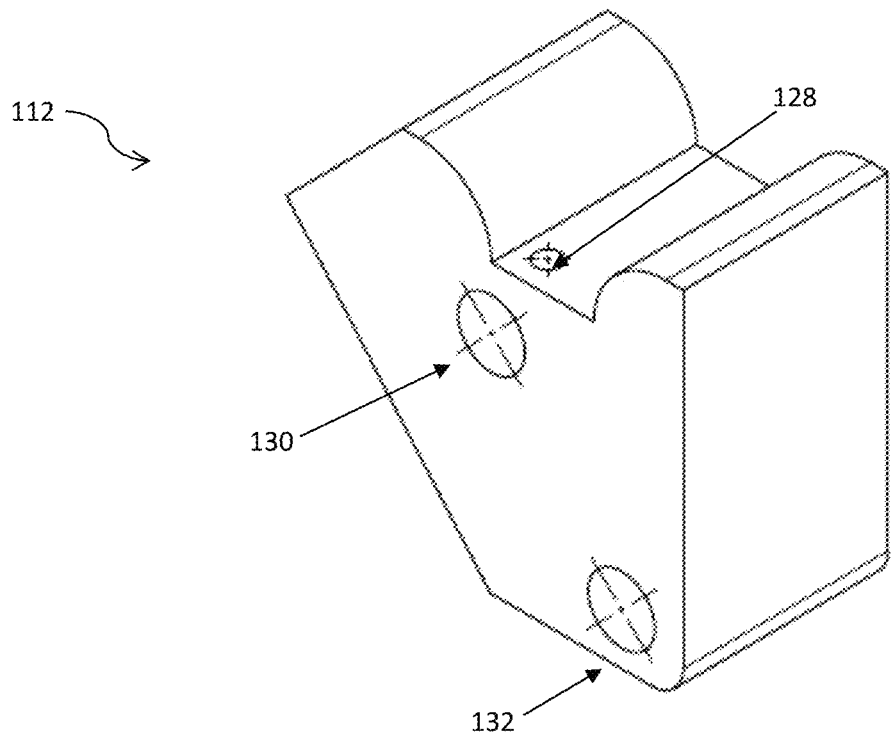
FIG. 7 illustrates a perspective view of the print head of FIG. 6.

FIG. 6 and FIG. 7 illustrate one embodiment of a print head 112 for use in a system as disclosed herein that can liquefy the polymers and combine a composite filament 118 and a formation material 126 to form a composite material 116. As shown, the print head 112 includes an inlet 118 for a composite filament 18 and an inlet 126 for a formation material 26. The formation material inlet 126 can be angled with respect to the composite fiber inlet 128, for instance with an angle between the two of from about 20° to about 80°. The print head 112 can include a melt chamber 120 within which a composite filament 118 fed through the composite fiber inlet 128 can be combined with the formation material 126 fed through the formation material inlet 136. The size of the print head 112 including the melt chamber 120 can be such that the print head includes an extended melt zone as compared to previously known print heads designed for fused filament formation techniques.

The relative rates of addition of the formation material 126 to the composite filament 118 can vary. For instance, the formation material 126 can be combined with the composite filament 118 within the melt chamber 120 and the flow rate of the formation material 126 through the inlet 136 can be somewhat less than the flow rate of the composite filament 118 through the inlet 128. In one embodiment, the flow rate of the formation material 126 through the print head 112 can be about 75% or less of the flow rate of the composite filament 118 through the print heat 112. In some embodiments, the flow rate of the formation material 126 through the print head 112 can be from about 20% to about 60%, or from about 22% to about 32% of the flow rate of the composite filament 118 through the print head 112. Of course, flow rates of materials are not limited to this range, and in some embodiments, it may be beneficial to feed a formation material at a higher or lower feed rate as compared to the feed rate of the composite fiber. For instance, it may be preferred to feed the formation material through the print head at a higher flow rate than the composite fiber in some embodiments.

It may be beneficial in some embodiments to monitor the flow rate of the components, particularly of the composite filament 118, as well as incorporate a tension control in the system, so as to avoid filament breakage. For instance, a system can incorporate a flow rate feedback system that can provide for tension control of the composite filament tension.

To improve deposition, the various materials can be preheated prior to deposition. For instance, and as illustrated in FIG. 6 and FIG. 7, a print head 112 can include a first heater at an insert 130 that can be utilized for heating a formation material 126 fed through the inlet 136 and a composite filament 118 fed through the inlet 128 prior to their combination in the melt chamber 120. The print head 112 can optionally include a second heater at an insert 132 that can heat the combined composite material 116. The first and second heaters can be held at temperatures that are the same or different from one another. In one embodiment, the second heater at 132 can be at a lower temperature than the first heater at 130. The nozzle 119 can be heated to a nozzle temperature, either via the second heater at 132 or via a separate heating system for the nozzle, as desired.

In one embodiment, the formation material 126, the composite filament 118, and/or the composite material 116 can be pre-heated within the print head 112 or upstream of the print head and prior to deposition by use of one or more heaters to a temperature of about 360° C. or greater, for instance from about 360° C. to about 420° C. in some embodiments. Optionally, the nozzle 119 of the print head 112 can be heated to a similar temperature, e.g., about 360° C. or greater, for instance from about 360° C. to about 420° C. in some embodiments. The various heaters can thus provide a print temperature envelope of from about 360° C. to about 420°.

A print head may be configured to apply one or multiple coatings of formation material on a composite filament. For instance, a deposition process can include periods of deposition of composite material in conjunction with periods of deposition of the formation material alone, which can provide additional areas of formation material adjacent to areas of the composite material. For instance, a deposition process can provide areas of composite material and areas of formation material stacked on the other, overlapping or applied at different positions on the printing surface.

Further, a print head can be configured to advance several different composite filaments with different or the same formation materials, depending on the specifications required for formation of a work piece. In addition, a system can include multiple nozzles on a single print head and/or multiple print heads and/or multiple end effectors configured to provide either the same or different print media to a work piece, so that different compositions of materials may be used to form the work piece. For example, some print heads can be configured to either advance different composite filaments and/or formation materials to provide different composite materials to be selectively applied to the work piece. In further or alternative embodiments, some print heads may be configured to provide continuous filament reinforced composite material, while other print heads provide non-reinforced printing media to thereby provide a work piece that has selective reinforced sections.

Discharge of the composite material 116 from a print head 112 can be achieved in different manners, depending on the application. In one embodiment, the composite filament 118 may be advanced through the print head 112 as part of an extrusion process, whereby the continuous filament 118 is "pushed" or urged through the print head 112. In this embodiment, the continuous filament 118 is engaged with a driving system, such as a motorized friction drive wheel(s) or a forced air system, to advance the continuous filament 118 through the print head 112. For instance a continuous filament 118 can enter the inlet 128 in the print head 112 and can be advanced toward the extrusion tip of the nozzle 119. The formation material 126 can be heated above the softening or melting temperature of the formation material 126 and the composite filament 118 can be heated above the melting temperature of the polymer therein to soften and/or liquefy so as to combine the two in the melt chamber 120 and thence pass through the nozzle 119. The composite material 116 can thus be advanced from the print head 112 and onto a printing surface, a mandrel and/or an existing work piece on a print bed. By movement of the print head 112 and the printing surface relative to one another, structures can be formed by additive application of the composite material 16 onto the printing surface, mandrel, and/or existing work piece.

As an alternative to advancing the composite filament by push or urging through the print head, the composite filament and formation material may be advanced by a pultrusion operation, whereby the composite material is drawn or pulled from the tip of the nozzle. In this embodiment, the contact point of the composite material on the printing surface of the print bed, a mandrel located on the printing surface, and/or an existing work piece located on the printing surface can create an anchor (e.g., a fixed, contact, gripping point, and the like) that allows for the composite material to be pulled from the print head as the printing surface is moved relative to the print head.

Referring again to FIG. 5, drawing or "casting on" of the composite material 16 onto the printing surface 22, mandrel and/or existing work piece to begin the printing process can be accomplished by various methods. For example, the composite material 16 can be connected or adhered to a needle or other type structure that can draw the composite material 16 from the print head and apply it to the printing surface 22, mandrel, and/or existing work piece. As an alternative, the nozzle 19 of the print head 12 may be brought into contact with the printing surface 22, the mandrel, and/or the existing work piece so as to contact the composite material 16, whereby the composite material 16 (e.g., the formation material 26 encompassed in the composite material 16) can adhere to the printing surface 22, mandrel, and/or the existing work piece creating an anchor for pulling the composite material 16 from the print head 12.

The rate of advancement of the composite material 16 through the print head 12, the temperature of the formation material 26, the polymer of the composite filament 18 and/or in some instances, the temperature of the printing surface 22, the mandrel, and/or the existing work piece on the print bed require some level of control to ensure that the composite material 16 is applied in a manner to provide desired adherence. For example, the temperature of the formation material 26 and the composite filament 18 and the rate of movement of the print bed and/or mandrel may be controlled to ensure that the composite material 16 is applied in a manner to allow for proper adherence of the composite material 16 to the printing surface 22, mandrel, and/or existing work piece. In some instances, the printing surface and/or the mandrel and/or the existing work piece on which the composite material 16 is applied can also or alternatively be temperature controlled for this purpose. In general, the rate of combination and temperature of the formation material 26 on the composite filament 18 are controlled to ensure that the formation material 26 is combined in a desired manner with the composite filament 18 and that the composite material 16 is drawn from the print head 12 in a consistent manner. By way of example, a print speed for deposition of a composite material 16 onto a surface can be about 5 mm/sec or more, about 20 mm/sec or more, or about 50 mm/sec or more in some embodiments.

Tensioning of the composite material 16 may also be required for proper advancement onto the printing surface, mandrel, and/or existing work piece. Tensioning systems can take many forms and be located at different positions in the process to provide proper tensioning of the composite filament 18 and/or the composite material 16. For example, a spool maintaining the composite filament 18 can be fitted on a tensioning system, such as a rotational break or clutch that impedes rotation of the spool as composite filament 18 is meted from the spool to provide tensioning. Similarly, the print head 12 may include a tensioning system, such as restrictive pulleys, clutch, friction element or the like to apply tension to the composite material 16.

It is also contemplated that the printer can be equipped to perform both "push" and "pull" of the composite material 16 to advance the composite filament 18 through the print head 12. In this embodiment, there may be drive means associated with the print head 12 to advance the composite material 16 through the print head assisted by a pulling effect of the movement of the print bed, mandrel, and/or existing work piece on the composite material as it is advanced.

As mentioned above, the composite material 16 may be applied to a mandrel, where the mandrel operates as a form, support and/or pattern of the work piece to be manufactured from the composite material 16. The mandrel aids in shaping of the work piece being printed as the composite material 16 is applied to the mandrel. After printing is complete, and the printed work piece has at least partially cured, the mandrel can be removed from the work piece, such as by eroding, dissolving, breakings, shrinking, or other contemplated procedures for removing either portions of or the entire mandrel.

According to one embodiment, a structure that incorporates the composite filament can be formed by use of a 3D printer that utilizes a six (6) Degrees of Freedom (or more, including seven degrees of freedom) system that allows the printing of composite material in different directions and orientations relative to a plane perpendicular of a print bed. By the term "6 Degrees of Freedom" refers to the freedom of movement in three-dimensional space of the print bed onto which the filaments are printed. Specifically, the print bed has six (6) independently controllably movements: three translational movements and three rotational movements. The translational movements are up/down, left/right, and forward/backward, and the three rotational movements are typically referred to as pitch, roll, and yaw. The print head may be fixed relative to some degrees of freedom, such as up/down, or alternatively also exhibit six degrees of freedom. In some embodiments, added degrees of freedom can be achieved by the introduction of a mandrel on the print bed to which composite material is applied. Orientation of the mandrel, itself, may be controlled relative to the print bed to provide added degrees of freedom (i.e., 7 degrees of freedom).

The various degrees of freedom of the print bed, and in some instances, the movement of an added mandrel, allow for complex introduction of filament(s) and/or composite materials into and/or within a work piece (e.g., object, part component, and the like) above and beyond what is achievable by a standard 3D printer. Instead of introduction of a filament and/or composite material in a stepped-fashion to a work piece, the orientation, elevation, angle, and the like of a filament(s) and/or composite material may be varied during the printing process to create complex printed formations/shapes within the work piece. For example, the filament(s) and/or composite material could be applied as the print bed is periodically or continuously altered in direction/orientation to create a complex pattern of filament(s) and/or composite material, such as for example, a zigzag pattern in the work piece or bend or complex shape in the work piece that cannot be achieved by linear application of material as performed by traditional 3D printers. The continuous filament(s) or composite material may even be twisted about itself by manipulation of the print bed and/or an alternative mandrel relative to the filament(s) or composite material during application.

Figure 8A:
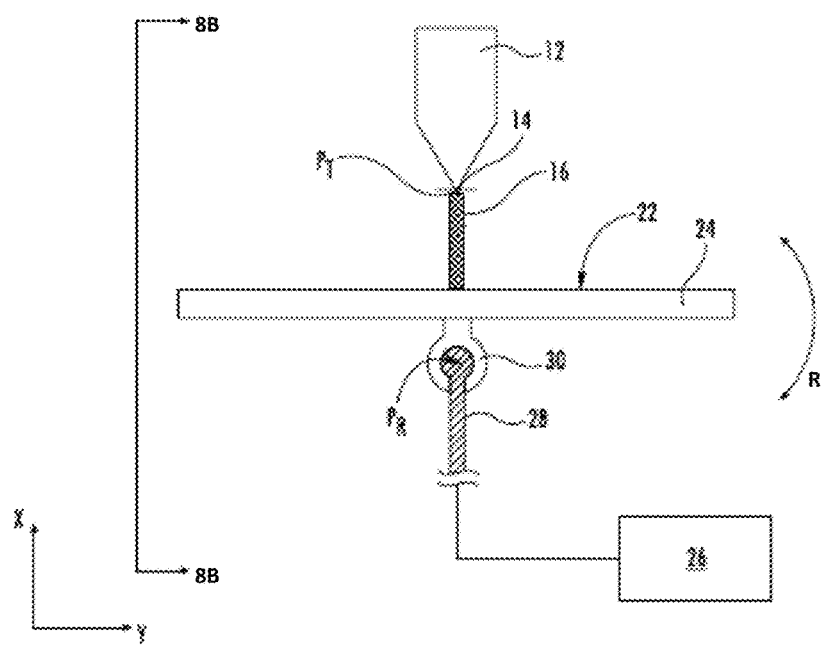
FIG. 8A shows a front view of an additive manufacturing process as may incorporate a composite filament.
Figure 8B:
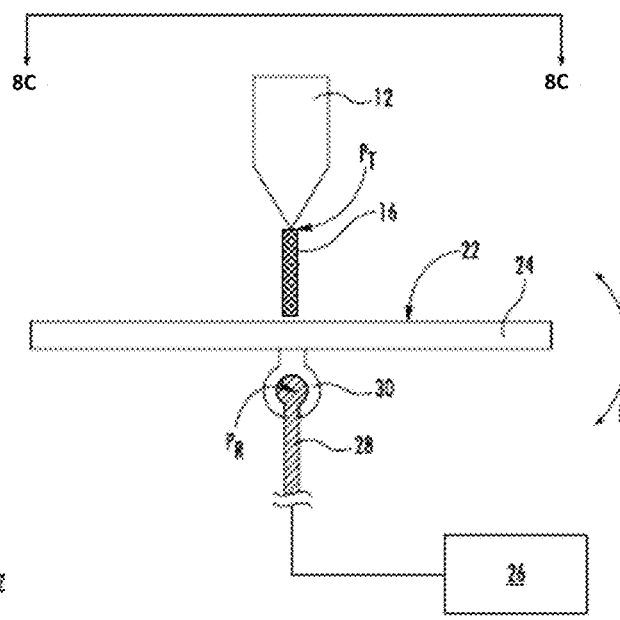
FIG. 8B shows a side view of the exemplary system of FIG. 8A.
Figure 8C:
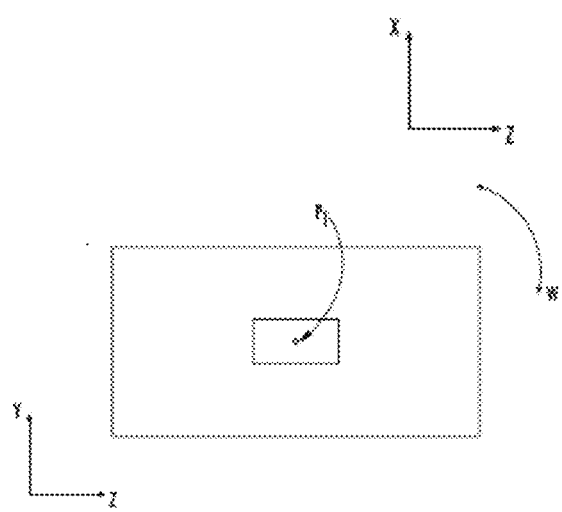
FIG. 8C shows a top view of the exemplary system of FIG. 8A.

FIGS. 8A, 8B, and 8C show an exemplary system including a nozzle 12 having an extrusion tip 14 defining a translational point $P_T$. The nozzle 12 combines a formation material 26 and a composite filament 18 to form a composite material 16 as described above and illustrated in FIG. 5. During printing, the composite material 16 is deposited onto the printing surface 22 of the print bed 24 and/or a mandrel (not shown) located on the printing surface. The print bed 24 is moveable, independently with 6 degrees of freedom, as controlled by the controller 26.

The print bed 24 is moveable in the x-direction (i.e., up/down with respect to the translational point $P_T$), in the y-direction (i.e., laterally with respect to the translational point $P_T$), and z-direction (i.e., cross-laterally with respect to the translational point $P_T$). The print bed 24 can be moved translational, independently, by controller 26 using the arm 28 connected to the receiver 30 of the print bed 24. In particular embodiments, the arm 28 can be formed from multiple segments connected together at moveable joints (bending and/or rotating) to allow for translational movement of the print bed 24 with respect to the translation point $P_T$.

Additionally, the print bed 24 is rotationally movable about the rotational point $P_R$ to allow roll (r), pitch (p), and yaw (w) rotational movement. The print bed 24 can be rotated in any direction, independently, by controller 26 using the arm 28 connected to the receiver 30 of the print bed 24. Although shown as utilizing a rotation ball 29 coupled to the receiver 30, any suitable connection can be utilized.

In one embodiment, the controller 26 may comprise a computer or other suitable processing unit. Thus, in several embodiments, the controller 26 may include suitable computer-readable instructions that, when implemented, configure the controller 26 to perform various different functions, such as receiving, transmitting and/or executing arm movement control signals.

A computer generally includes a processor(s) and a memory. The processor(s) can be any known processing device. Memory can include any suitable computer-readable medium or media, including, but not limited to, RAM, ROM, hard drives, flash drives, or other memory devices. The memory can be non-transitory. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits. Memory can also include data that may be retrieved, manipulated, or stored by processor(s).

The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the arm 28, the rotation ball 29, and/or the nozzle 12.

In one particular embodiment, the controller 26 can include (or be in communication with a computer that includes) supporting software programs that can include, for example, computer aided design (CAD) software and additive manufacturing layering software as are known in the art. The controller 26 can operate via the software to create a three-dimensional drawing of a desired structure and/or to convert the drawing into multiple elevation layer data. For instance, the design of a three-dimensional structure can be provided to the computer utilizing commercially available CAD software. The structure design can then be sectioned into multiple layers by commercially available layering software. Each layer can have a unique shape and dimension. The layers, following formation, can reproduce the complete shape of the desired structure.

For example, the printer can be accompanied with software to slice beyond the current xyz slicing methodology used in industry. For example, 3D objects other than 3D Cartesian objects, such as a iso-parametric helically/spirally winded band around a duct, can be spirally sliced instead of sliced in a flat plane, to be able to spirally lay-down/print filament and/or slit tape/tow. Thus, the iso-parametrical slicing can be utilized with printing capability of the 6 degrees of freedom.

Numerous software programs have become available that are capable of performing the functions. For example, AUTOLISP can be used in a slicing operation as is known in the art to convert AUTOCAD STL files into multiple layers of specific patterns/toolpaths and dimensions. CGI (Capture Geometry Inside, currently located at 15161 Technology Drive, Minneapolis, Minn.) also can provide capabilities of digitizing complete geometry of a three-dimensional object and creating multiple-layer data files. The controller 26 can be electronically linked to mechanical drive means so as to actuate the mechanical drive means in response to "x," "y," and "z" axis drive signals and "p," "r," and "w," rotation signals, respectively, for each layer as received from the controller 26.

A system can include additional components as are generally known in the art that can aid in the deposition process. For instance, a system can include an accelerometer that can monitor the load on the composite filament and/or the composite material for break of the fiber during deposition. In one embodiment, a system can include auditory capability, for instance a directed microphone that can detect scraping of the composite fiber within the print head, which can detect warping and/or high tension of the filament. A print head can be utilized in conjunction with laser devices or thermal imaging cameras that can provide data with regard to the printing process, e.g., print height, cooling rate of deposited materials, etc.; a 3D scanner for real time verification of deposited geometry, etc. In addition, a system can include an active cooling mechanism for cooling the deposited material.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in-whole or in part. Furthermore, those of ordinary skill in the art will appreciate that the foregoing description is by way of example only, and is not intended to limit the invention so further described in the appended claims.

What is claimed:

1. A method for forming a composite filament for use with an additive manufacturing device comprising:
   immersing a continuous filament in a first solution, the first solution including a first thermoplastic polymer exhibiting a glass transition temperature of about 150° C. or greater and a solvent for the first thermoplastic polymer,
   pulling or pushing the continuous filament over a first series of rollers that are immersed in the first solution, the first solution permeating the continuous filament during the immersion to form a wet composite filament;
   immersing the wet composite filament in a second solution, the second solution including a second thermoplastic polymer exhibiting a glass transition temperature of about 150° C. or greater and a solvent for the second polymer;
   pulling or pushing the wet composite filament over a second series of rollers that are immersed in the second solution;
   removing the solvents from the wet composite filament to form a dried composite filament;
   feeding the dried composite filament to a heated die;
   feeding a polymeric lubricant to the heated die, wherein the first thermoplastic polymer and a polymer of the polymeric lubricant are the same polymer, wherein the composite filament is shaped to a predetermined cross-sectional shape and coated with the polymeric lubricant within the heated die.

2. The method of claim 1, wherein the wet composite filament is air dried or is subjected to energy to encourage the solvent removal.

3. The method of claim 1, wherein the continuous filament is pulled through the first solution.

4. The method of claim 1, wherein the continuous filament is a component of a continuous filament roving.

5. The method of claim 1, wherein the pre-determined cross-sectional shape comprises a circular cross-sectional shape.

6. The method of claim 1, wherein the pre-determined cross-sectional shape comprises a flat tape or an oval.

7. The method of claim 1, wherein the first thermoplastic polymer and the second thermoplastic polymer are the same polymer.

8. The method of claim 1, further comprising collecting the composite fiber by use of a take-up reel following exit of the composite filament from the die.

9. The method of claim 1, the first thermoplastic polymer comprising polyethyleneimine, polyetherimide, polyimide-imide, polyarylate, poly(ether sulfone), polyimide, polyphenylene, or amorphous thermoplastic polyimide.

10. The method of claim 1, the first solution including the first thermoplastic polymer in an amount of about 20 wt. % or less.

11. The method of claim 1, the second solution including the second thermoplastic polymer in an amount of about 20 wt. % or less.

12. The method of claim 1, the continuous filament having an ultimate tensile strength of about 3,000 MPa or greater.

13. The method of claim 1, wherein the polymeric lubricant is in the form of a polymer tape or fiber.

14. A method for forming a composite filament for use with an additive manufacturing device comprising:
   immersing a continuous filament in a first solution, the first solution including a first thermoplastic polymer exhibiting a glass transition temperature of about 150° C. or greater and a solvent for the first thermoplastic polymer, pulling or pushing the continuous filament over a first series of rollers that are immersed in the first solution, the first solution permeating the continuous filament during the immersion to form a wet composite filament;
   immersing the wet composite filament in a second solution, the second solution including a second thermoplastic polymer exhibiting a glass transition temperature of about 150° C. or greater and a solvent for the second polymer;
   pulling or pushing the wet composite filament over a second series of rollers that are immersed in the second solution;
   removing the solvents from the wet composite filament to form a dried composite fiber;
   feeding the dried composite filament to a heated die;
   feeding a polymeric lubricant to the heated die, wherein the polymeric lubricant is in the form of a polymer tape or fiber, wherein the composite filament is shaped to a predetermined cross-sectional shape and coated with the polymeric lubricant within the heated die.

15. The method of claim 14, wherein the wet composite filament is air dried or is subjected to energy to encourage the solvent removal.

16. The method of claim 14, wherein the continuous filament is pulled through the first solution.

17. The method of claim 14, wherein the continuous filament is a component of a continuous filament roving.

18. The method of claim 14, wherein the pre-determined cross-sectional shape comprises a circular cross-sectional shape.

19. The method of claim 14, wherein the pre-determined cross-sectional shape comprises a flat tape or an oval.

20. The method of claim 14, wherein the first thermoplastic polymer and the second thermoplastic polymer are the same polymer.

21. The method of claim 14, further comprising collecting the composite fiber by use of a take-up reel following exit of the composite filament from the die.

22. The method of claim 14, the first thermoplastic polymer comprising polyethyleneimine, polyetherimide, polyamide-imide, polyarylate, poly(ether sulfone), polyimide, polyphenylene, or amorphous thermoplastic polyimide.

23. The method of claim 14, the first solution including the first thermoplastic polymer in an amount of about 20 wt. % or less.

24. The method of claim 14, the second solution including the second thermoplastic polymer in an amount of about 20 wt. % or less.

25. The method of claim 14, the continuous filament having an ultimate tensile strength of about 3,000 MPa or greater.

* * * * *